United States Patent
Veliu et al.

(10) Patent No.: US 8,351,917 B2
(45) Date of Patent: *Jan. 8, 2013

(54) METHOD OF ACTIVATING A DEVICE

(75) Inventors: Shpetim S. Veliu, Livonia, MI (US); Joseph K. Medley, Macomb, MI (US)

(73) Assignee: General Motors LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/448,863

(22) Filed: Apr. 17, 2012

(65) Prior Publication Data

US 2012/0202476 A1   Aug. 9, 2012

Related U.S. Application Data

(63) Continuation of application No. 12/550,133, filed on Aug. 28, 2009, now Pat. No. 8,180,337.

(51) Int. Cl.
   *H02M 3/00* (2006.01)
(52) U.S. Cl. .............. 455/420; 455/3.06; 455/414.1; 455/41.2; 455/41.3; 455/550.1; 455/564; 455/569.1; 455/569.2; 340/426.12; 340/426.13; 340/426.14; 340/426.15; 340/426.16; 340/426.17; 340/426.2
(58) Field of Classification Search .............. 455/418, 455/419, 420, 3.06, 414.1, 417, 558, 445, 455/461, 39, 41.1, 41.2, 41.3, 550.1, 564, 455/569.2; 340/426.12, 426.13, 426.14, 340/426.15, 426.16, 426.17, 426.2

See application file for complete search history.

(56) References Cited

U.S. PATENT DOCUMENTS

| | | |
|---|---|---|
| 6,549,770 B1 | 4/2003 | Marran |
| 6,915,126 B2 | 7/2005 | Mazzara, Jr. |
| 7,224,969 B2 | 5/2007 | Stark et al. |
| 7,486,950 B2 * | 2/2009 | Losch .......................... 455/417 |
| 7,599,690 B2 | 10/2009 | Kamdar et al. |
| 7,873,345 B1 | 1/2011 | Dunne et al. |
| 7,894,795 B1 | 2/2011 | Dunne et al. |
| 8,145,212 B2 * | 3/2012 | Lopresti et al. ............... 455/433 |
| 2003/0092451 A1 * | 5/2003 | Holloway et al. ............. 455/461 |
| 2003/0139173 A1 | 7/2003 | Mazzara, Jr. et al. |
| 2004/0166828 A1 | 8/2004 | Yosioka |
| 2004/0192404 A1 | 9/2004 | Zenios et al. |
| 2005/0064861 A1 | 3/2005 | Nishida |
| 2005/0130723 A1 * | 6/2005 | Grivas et al. ................ 455/575.9 |
| 2007/0190995 A1 * | 8/2007 | Wang et al. ................... 455/419 |
| 2007/0244628 A1 | 10/2007 | Rockett et al. |

* cited by examiner

*Primary Examiner* — Olumide T Ajibade Akonai
(74) *Attorney, Agent, or Firm* — Dierker & Associates, P.C.

(57) ABSTRACT

A method of activating a device involves establishing communication between the device and another device and receiving, at the other device, a message including activation information from a third party facility. The activation information includes a header and a mobile dialing number. The method further includes using the header to identify the message as an activation message for the device and, via the device, retrieving the identified message from the other device. The mobile dialing number is stored in a memory associated with the device, where the mobile dialing number enables the third party facility to initiate communication with the device.

19 Claims, 2 Drawing Sheets

METHOD OF ACTIVATING A DEVICE

CROSS REFERENCE TO RELATED APPLICATION

This application is a continuation of U.S. patent application Ser. No. 12/550,133, filed Aug. 28, 2009, which is now U.S. Pat. No. 8,180,337, and which is incorporated herein by reference in its entirety.

TECHNICAL FIELD

The present disclosure relates generally to methods of activating a device.

BACKGROUND

Activated telematics units are often associated with an activation number (such as, e.g., a mobile dialing number, phone number, or the like), which enables the telematics unit to receive incoming calls from, e.g., a call center. In some instances, such as, e.g., at the expiration of a subscription agreement, the telematics unit is deactivated and the activation number is recycled. The telematics unit remains deactivated until it is reactivated. Reactivation of the telematics unit often entails, for example, the user having to call the call center from inside the vehicle and partake in a relatively timely reactivation procedure with one or more human and/or automated advisors.

SUMMARY

A method of activating a device is disclosed herein. The method involves establishing communication between the device and another device and receiving, at the other device, a message including activation information from a third party facility. The activation information includes a header and a mobile dialing number. The device uses the header to identify the message as an activation message for the device and retrieves the message from the other device. The method further includes storing the mobile dialing number in a memory operatively associated with the device. The mobile dialing number enables the third party facility to initiate communication with the device.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
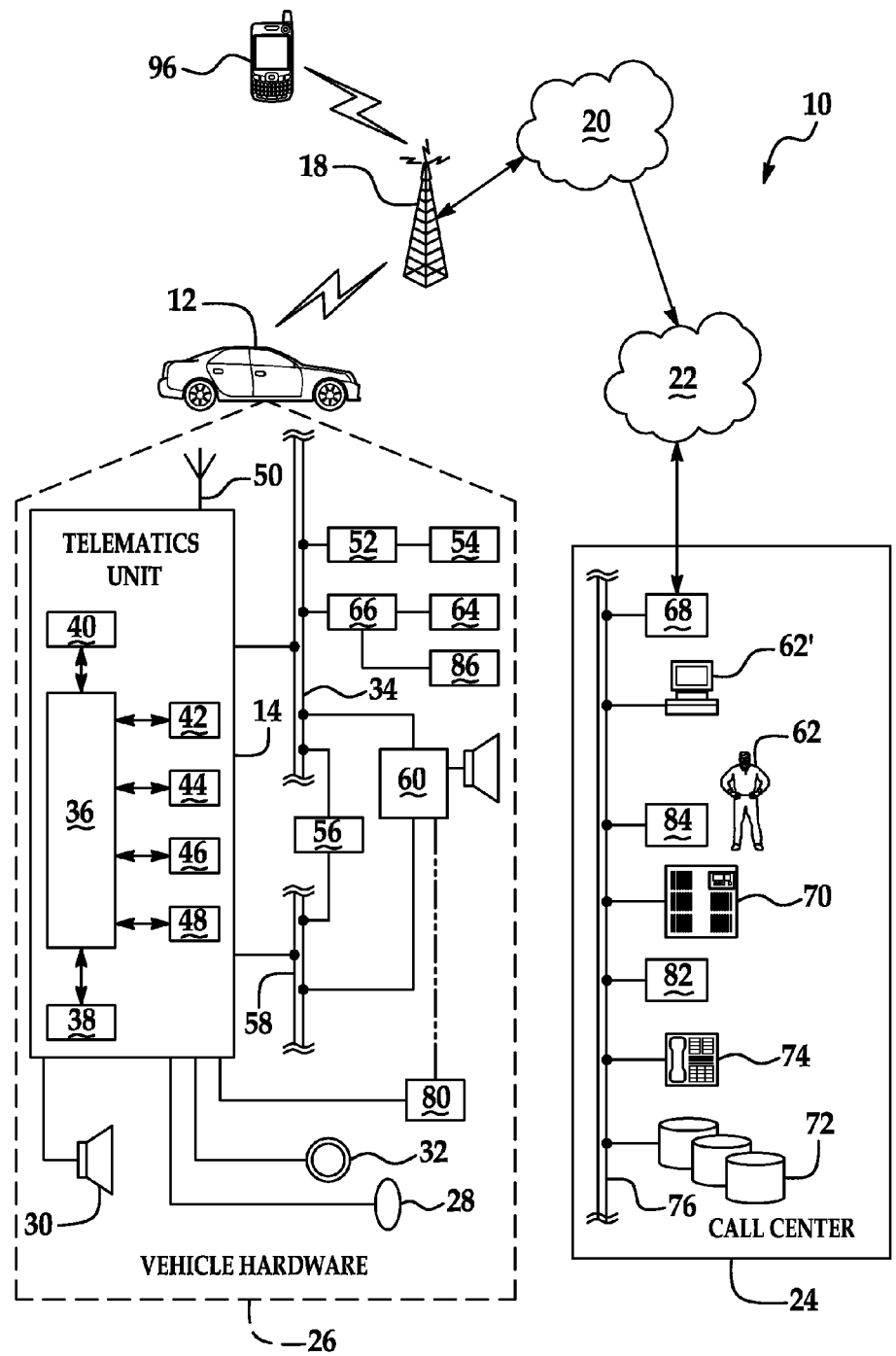
FIG. 1 is a schematic diagram depicting an example of a system for activating a device.

Example(s) of the method disclosed herein may advantageously be used to reactivate a deactivated device (e.g., a telematics unit) without a user having to initiate a reactivation request to a call center. This may be accomplished by establishing alternative communication with the deactivated device and submitting activation information from the call center to the deactivated device using the alternative communication means. In an example, the activation information includes data that, when stored in the deactivated device, enables the device to receive incoming calls. Once this occurs, the call center is able to directly establish communication with the previously deactivated device. The method described herein is advantageously efficient at least for purposes of reactivating deactivated devices, and requires less work on behalf of a user or subscriber during the reactivation process.

It is to be understood that, as used herein, the term "user" includes vehicle owners, operators, and/or passengers. It is to be further understood that the term "user" may be used interchangeably with subscriber/service subscriber.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

It is to be further understood that "communication" is to be construed to include all forms of communication, including direct and indirect communication. As such, indirect communication may include communication between two components with additional component(s) located therebetween.

As further used herein, a "deactivated device" or a "deactivated telematics unit" is a device or telematics unit that cannot provide services because a subscription with a call center has never been started, has expired or has been canceled. A deactivated device or telematics unit generally does not have stored therein a mobile dialing number and is, thus, incapable of receiving incoming calls such as, e.g., from the call center.

Additionally, the term "activation information" refers to any information or data pertaining to the activation of a device or to the reactivation of a deactivated device. In a non-limiting example, the activation information is included in an activation message. For instance, the activation message includes at least a header and a mobile dialing number, and is generally provided in the form of a text message, a short message service (SMS), or another similar format. As will be described in further detail below, in conjunction with FIG. 2, the activation message is transmittable from a call center 24 to a handheld communications device 96 (both shown in FIG. 1) by, e.g., a wireless communications system 16 (also shown in FIG. 1). Non-limiting examples of the handheld communications device 96 include a cellular phone, a personal digital assistant (PDA), a smart phone, a personal laptop computer, a netbook computer, or combinations thereof.

FIG. 1 described in detail below depicts a system (identified by reference character 10) for activating a telematics unit (identified by reference character 14). It is to be understood that the system 10 depicted in FIG. 1 is provided herein for purposes of illustrating one example of the instant disclosure. It is further to be understood that the examples of the method may also be used to activate or reactivate any suitable device; not necessarily limited to a telematics unit. Non-limiting examples of other devices include a cellular phone, a PDA, a personal computer having two-way communication capabilities, and/or the like, and/or combinations thereof. Such devices may be used in a mobile vehicle (such as the vehicle 12 shown in FIG. 1) or outside of a vehicle, and may be configured to provide services according to a subscription agreement with a third party facility (e.g., the call center 24 shown in FIG. 1).

Referring now to FIG. 1, in an example, the system 10 includes the vehicle 12, the telematics unit 14, the wireless carrier/communication system 16 (including, but not limited to, one or more cell towers 18, one or more base stations and/or mobile switching centers (MSCs) 20, and one or more service providers (not shown)), one or more land networks 22, and one or more call centers 24. In an example, the wireless carrier/communication system 16 is a two-way radio frequency communication system. The wireless carrier/communication system 16 may, for example, be used to establish communication between the call center 24 and the telematics unit 14. The wireless carrier/communication system 16 may also be used to establish communication between the call center 24 and the handheld communications device 96.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicle 12 is a mobile vehicle such as a motorcycle, car, truck, recreational vehicle (RV), boat, plane, etc., and is equipped with suitable hardware and software that enables it to communicate (e.g., transmit and/or receive voice and data communications) over the wireless carrier/communication system 16. It is to be understood that the vehicle 12 may also include additional components suitable for use in the telematics unit 14.

Some of the vehicle hardware 26 is shown generally in FIG. 1, including the telematics unit 14 and other components that are operatively connected to the telematics unit 14. Examples of such other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard device that, when activated or reactivated, provides a variety of services, both individually and through its communication with the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In one example, the wireless modem 42 includes a computer program and/or set of software routines executing within processing device 36.

It is to be understood that the telematics unit 14 may be implemented without one or more of the above listed components, such as, for example, the wireless modem 42. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor. In a non-limiting example, the electronic processing device (also referred to herein as a processor) 36 includes software programs having computer readable code to initiate and/or perform one or more steps of the examples of the method disclosed herein. For instance, the software programs may include computer readable code for examining the handheld communications device 96 for receipt of an activation message from the call center 24, and computer readable code for extracting a mobile dialing number from the activation message. The information extracted from the activation message (e.g., the mobile dialing number, etc.) may be stored in the electronic memory 38 selectively and operatively associated with processor 36 and the telematics unit 14.

The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The telematics unit 14 provides numerous services, some of which may not be listed herein, and is configured to fulfill one or more user or subscriber requests. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering.

Vehicle communications generally utilize radio transmissions to establish a voice channel with wireless carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

Microphone 28 provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62'). In another example, one of the buttons 32 may be used to initiate emergency services.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58.

The vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, and/or the like. One or more of the sensors 64 enumerated above may be used to obtain the vehicle data for use by the telematics unit 14 or the call center 24 to determine the operation of the vehicle 12. Non-limiting example sensor interface modules 66 include powertrain control, climate control, body control, and/or the like.

In a non-limiting example, the vehicle hardware 26 includes a display 80, which may be operatively directly connected to or in communication with the telematics unit 14, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

Wireless carrier/communication system 16 may be a cellular telephone system or any other suitable wireless system that transmits signals between the vehicle hardware 26 and land network 22. According to an example, wireless carrier/communication system 16 includes one or more cell towers 18, base stations and/or mobile switching centers (MSCs) 20, as well as any other networking components required to connect the wireless system 16 with land network 22. It is to be understood that various cell tower/base station/MSC arrangements are possible and could be used with wireless system 16. For example, a base station 20 and a cell tower 18 may be co-located at the same site or they could be remotely located, and a single base station 20 may be coupled to various cell towers 18 or various base stations 20 could be coupled with a single MSC 20. A speech codec or vocoder may also be incorporated in one or more of the base stations 20, but depending on the particular architecture of the wireless network 16, it could be incorporated within a Mobile Switching Center 20 or some other network components as well.

Land network 22 may be a conventional land-based telecommunications network that is connected to one or more landline telephones and connects wireless carrier/communication network 16 to call center 24. For example, land network 22 may include a public switched telephone network (PSTN) and/or an Internet protocol (IP) network. It is to be understood that one or more segments of the land network 22 may be implemented in the form of a standard wired network, a fiber of other optical network, a cable network, other wireless networks such as wireless local networks (WLANs) or networks providing broadband wireless access (BWA), or any combination thereof.

Call center 24 is designed to provide the vehicle hardware 26 with a number of different system back-end functions. For example, the call center 24 may be configured to reactivate the telematics unit 14 (when deactivated) by generating and transmitting an activation message to the handheld communications device 96. As will be described in further detail below, the telematics unit 14 examines the handheld device 96 (through the short range wireless connection therewith) to identify the message sent by the call center 24 as an activation message. Upon identifying the message as an activation message, the telematics unit 14 extracts and saves at least the mobile dialing number included in the message. Upon receiving notification that the telematics unit 14 has saved the mobile dialing number, the call center 24 is further configured to initiate communication directly with the telematics unit 14 to re-commission the telematics unit 14 (i.e., associated the activated telematics unit 14 with a user profile).

According to the example shown here, the call center 24 generally includes one or more switches 68, servers 70, databases 72, live and/or automated advisors 62, 62', a processor 84, as well as a variety of other telecommunication and computer equipment 74 that is known to those skilled in the art. These various call center components are coupled to one another via a network connection or bus 76, such as one similar to the vehicle bus 34 previously described in connection with the vehicle hardware 26.

The processor 84, which is often used in conjunction with the computer equipment 74, is generally equipped with suitable software and/or programs configured to accomplish a variety of call center 24 functions.

The live advisor 62 may be physically present at the call center 24 or may be located remote from the call center 24 while communicating therethrough.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72. For example, database 72 may be designed to store subscriber profile records, subscriber behavioral patterns, or any other pertinent subscriber information. Although the illustrated example has been described as it would be used in conjunction with a manned call center 24, it is to be appreciated that the call center 24 may be any central or remote facility, manned or unmanned, mobile or fixed, to or from which it is desirable to exchange voice and data communications.

A cellular service provider generally owns and/or operates the wireless carrier/communication system 16. It is to be understood that, although the cellular service provider (not shown) may be located at the call center 24, the call center 24 is a separate and distinct entity from the cellular service provider. In an example, the cellular service provider is located remote from the call center 24. A cellular service provider provides the user with telephone and/or Internet services, while the call center 24 is a telematics service provider. The cellular service provider is generally a wireless carrier (such as, for example, Verizon Wireless®, AT&T®, Sprint®, etc.). It is to be understood that the cellular service provider may interact with the call center 24 to provide various service(s) to the user.

Figure 2:
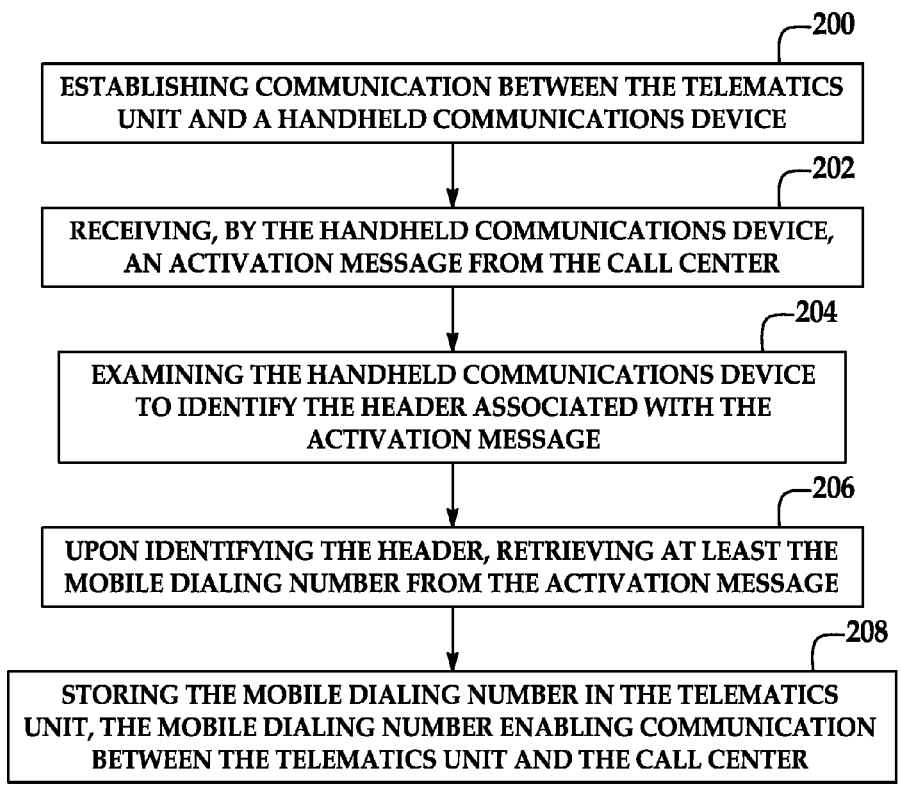
FIG. 2 is a flow diagram depicting an example of a method of activating a device.

An example of the method of activating a device (such as the telematics unit 14) is described herein in conjunction with FIGS. 1 and 2. As shown in FIG. 2, the method includes establishing communication between the telematics unit 14 and the handheld communications device 96 (as shown by reference numeral 200). In an example, such communication may be established by pairing the telematics unit 14 with the handheld device 96 using a short range wireless connection such as, e.g., a Bluetooth® connection (often referred to as Bluetooth® enabled pairing). The communication may otherwise be established using other short range wireless connection means, non-limiting examples of which include using an IEEE 802.11a standard, an IEEE 802.11b standard, an IEEE 802.11g standard, an IEEE 802.11n standard, WiFi, ZigBee®, or combinations thereof.

In an example, the communication established between the telematics unit 14 and the handheld device 96 may be automatically established at vehicle start-up or at the beginning of an ignition cycle of the vehicle 12. In another example, the communication may be established at a desirable time by a user of the vehicle 12 (such as, e.g., via a button press or via another activation means). The communication may be established for so long as the vehicle 12 is operating and/or the handheld device 96 is operating, until the user disconnects the telematics unit 14 from the handheld device 96 (e.g., via another button press or via another deactivation means), or for a prescribed amount of time (e.g., ten minutes, an hour, for as long as the vehicle 12 is operating, etc.).

The instant example of the method further includes establishing communication between the handheld device 96 and the call center 24 (not shown in FIG. 2). Such communication may be accomplished using the same wireless network connection 16 as that which is normally used to establish communication between the call center 24 and the telematics unit 14 when it is activated.

In an example, the communication between the call center 24 and the handheld device 96 may be established by calling or even sending (via the wireless communication system 16) one or more text messages, SMS messages, or the like to the call center 24 from the handheld device 96. For instance, if the user recognizes that there is or may be a problem with his/her telematics unit, the user may call or send a message to the call center 24 using the handheld device 96. The user may either request reactivation of the telematics unit 14 or request that the call center 24 run diagnostics on his/her telematics unit 14. In instances where the call center 24 does not have a complete record of the deactivated telematics unit 14, the call center 24 may request, from the user, any pertinent information related to the deactivated telematics unit 14 to complete and/or update the record. Upon receiving the user's call, the switch 68 at the call center 24 directs the call to an appropriate human or automated advisor 62, 62', who/which, after identifying that the telematics unit 14 is deactivated, prepares an activation message to be sent back to the handheld device 96.

In another example, the communication between the call center 24 and the handheld device 96 may be initiated by the call center 24 and established by sending (via the wireless communication system 16) one or more text messages, SMS's, or the like to the handheld device 96. For instance, prior to establishing communication with the handheld device 96, the call center 24 may attempt to contact the telematics unit 14 (assuming that the call center 24 is aware of the existence of the telematics unit 14) and fail as a result of its deactivation. In some cases, the telematics unit 14 may be linked to the user's personal profile at the call center 24 (e.g., via the serial number or another like identifier), and this profile also includes the user's personal information, such as address, home and/or cell phone numbers, email address, etc. As such, the call center advisor 62, 62' may query the database 72 of user profiles to determine if the user associated with the deactivated telematics unit 14 has a handheld device 96. Upon making such a determination, the call center 24 may then proceed with establishing communication with the handheld device 96 in the event that the user's profile includes identification information for the handheld device 96.

Upon receiving a user request to reactivate the telematics unit 14 (or realizing that the telematics unit 14 is in fact deactivated in instances where the call center 24 initiates communication with the handheld device 96), the call center 24 generates a text message and/or SMS including an activation message for reactivating the telematics unit 14. In some cases, the text message and/or the SMS may be computer generated at the call center 24 using appropriate software routines, and the message may be automatically transmitted to the handheld device 96 from the call center 24. Transmission of the message may be accomplished during a single occurrence or even periodically so long as the telematics unit 14 is deactivated.

The text message and/or SMS that is transmitted to the handheld device 96 from the call center 24 includes a header field, a mobile dialing number field, and possibly one or more additional fields containing commands, other data, or the like. The fields included in the message are generally delimited by a period, and words included in each field are separated using an underscore. An example of an SMS message is depicted as follows:

HEADER.MOBILE_DIALING_NUMBER.COMMAND_OR_DATA.

The header field generally includes any information that identifies the message as an activation message, where such information is recognizable by the telematics unit 14. The header may include, for example, a line of text such as a device identification number, a vehicle identification number, a subscriber's name, a security code, an activation command, or combinations thereof.

In some instances, the message transmitted from the call center 24 to the telematics unit 14 includes an SMS embedded with graphical information via a multimedia messaging service (MMS). In these instances, the header may include text as well as the graphical information that pictorially identifies the message as an activation message. For example, the MMS may include a user-selected image or picture identifying the subscriber, the subscriber's vehicle, the device, or the like. Selection of the image or picture may be accomplished, for example, by accessing a remotely accessible page (such as a webpage) while connected to the Internet (not shown in the figures), and associating the picture with the subscriber, the vehicle, the device, or the like.

The mobile dialing number included in the activation message is a phone number that, when extracted and stored by the telematics unit 14, allows the call center 24, for example, to establish communication with the telematics unit 14. In other words, the mobile dialing number becomes associated with the telematics unit 14, and enables the call center 24 to call the telematics unit 14 directly.

The other information included in the activation message may contain, e.g., commands and/or other data related to the reactivation of the telematics unit 14. For example, the other data may include subscription information pertaining to a specific telematics service, promotions, instructions for activating the telematics unit 14, and/or the like. For example, the activation message may contain a command to unlock the vehicle doors. Once the telematics unit 14 has been reactivated, the telematics unit 14 acts on the door unlock command that was stored therein. In this example, if the vehicle owner is not a subscriber of the telematics services, he/she may have a deactivated telematics unit 14, but may request the door unlock service for a one-time fee. In this instance, the telematics unit 14 may be activated (via the method disclosed herein), and then the call center 24 may send the door unlock request to the telematics unit 14. After performing the one-time door unlock service, the telematics unit 14 may be de-activated again.

Still referring to FIG. 2, the method further includes receiving the activation message by the handheld device 96 from the call center 24 (as shown by reference numeral 202 in FIG. 2) and may be temporarily stored in a transient memory (not shown in FIG. 1) operatively associated with the handheld device 96. In some instances, the received message is stored in the transient memory for a prescribed amount of time (e.g., 24 hours, seven days, or the like). If the received message is not used by the end of the prescribed amount of time, in many cases, the message is automatically deleted by the device 96.

Regardless of whether the activation message is sent to the handheld device 96 or not, the telematics unit 14 (via the short range wireless connection with the handheld device 96) examines all of the messages stored in the transient memory of the handheld device 96 to identify an activation message. It is to be understood that the deactivated telematics unit 14 is still operable and capable of performing many functions, but it cannot receive incoming calls. As such, the telematics unit 14, upon recognizing the short range connection with the handheld device 96, examines the handheld device 96 to identify the header associated with the activation message (as shown by reference numeral 204 in FIG. 2). The examining of the handheld device 96 may be accomplished upon initial recognition of the device 96, periodically after recognizing the device 96, in response to a particular trigger, and/or the like. In an example, the handheld device 96 is examined periodically, such as at the beginning of each predefined time interval (e.g., every hour, every day, etc.), according to a preset time using the real time clock 46, or the like.

As previously mentioned, the examining of the handheld device 96 may also or otherwise be accomplished in response to a trigger. As used herein, the term "trigger" refers to an event that, upon occurrence thereof, prompts the telematics unit 14 to look for and identify the handheld device 96 and, upon recognizing the short range wireless communication, then examining the handheld device 96. The trigger essentially causes the telematics unit 14 to transmit a signal that can be recognized by the handheld device 96. Upon receiving the signal from the telematics unit 14, the device 96 transmits a signal back to the telematics unit 14, thereby establishing the short range wireless connection therebetween. In one example, the telematics unit 14 may be configured to look for and identify the handheld device 96 in response to an engine start-up or at the start of an ignition cycle of the vehicle 12. In another example, the telematics unit 14 may be configured to look for and identify the handheld device 96 when the telematics unit 14 wakes up from a sleep cycle. In response to the trigger and upon identifying the device 96, the telematics unit 14 proceeds with the examining/scanning of the handheld device 96. The scanning of the handheld device 96 may be accomplished during a single occurrence or continuously so long as the short range communication is established between the handheld device 96 and the telematics unit 14.

In instances where the telematics unit 14 identifies a header that is associated with an activation message during the examining of the handheld device 96, the method further includes retrieving at least the mobile dialing number of the activation message from the handheld device 96 (as shown by reference numeral 206 in FIG. 2). In an example, the telematics unit 14 retrieves the entire activation message from the handheld device 96. Such may be accomplished, for example, when the activation request is for a single telematics service (such as, e.g., a door unlock). In another example, the telematics unit 14 extracts the mobile dialing number and at least one other portion (e.g., the header) from the activation message stored in the transient memory of the handheld device 96. For example, a software parser resident in the telematics unit 14 may be configured to recognize the header, index the message beyond the header to the next field (e.g., by detecting a period or other delimiter), and extract the mobile dialing number from the message. The software parser then moves to the next field and extracts the command and/or other data (if any). It is to be understood that the telematics unit 14 extracts only the mobile dialing number from the activation message if only the mobile dialing number is present. In situations where the activation message also includes other additional information or data, the other information or data is also extracted by the telematics unit 14. For example, if the message includes the mobile dialing number and a command to update software for the telematics unit 14, both would be extracted by the parser. The command would then be used, by the telematics unit 14, to update the software as soon as the telematics unit is re-activated.

In an example, the retrieved message or extracted mobile dialing number (and, in some cases, the other additional information) is stored in the electronic memory 36 operatively associated with the telematics unit 14 (as shown by reference numeral 208 in FIG. 2). To reiterate from above, upon storing at least the mobile dialing number in the memory 36, the mobile dialing number enables communication between the telematics unit 14 and the call center 24. It is to be understood that once the mobile dialing number is stored in the telematics unit 14, the telematics unit 14 is reactivated.

In one example, upon reactivating the telematics unit 14, the method further includes notifying the call center 24 of the same. The notifying of the call center 24 includes, for instance, initiating communication with the call center 24 and notifying the call center 24 that the mobile dialing number has been stored in the memory 36 of the telematics unit 14. In an example, communication with the call center 24 may be initiated by the telematics unit 14 after storing the mobile dialing number in the memory 36. Such notification may be accomplished automatically by the telematics unit 14 as soon as the mobile dialing number is stored therein. The notification may otherwise be accomplished manually by, e.g., a button press, a cellular call, or the like by the user of the vehicle 12 when the user is notified by the telematics unit 14 via, e.g., an audible or visual notification provided to the user from the audio component 60 or the display 80, respectively. In another example, communication with the call center 24 may be initiated by the handheld communications device 96 after the telematics unit 14 has retrieved the activation message or extracted at least the mobile dialing number from the activation message. In yet another example, the call center 24 is not notified by the telematics unit 14, the handheld device 96, or the user that the telematics unit 14 has stored the mobile dialing number therein. Rather, the call center 24 may attempt to call the telematics unit 14 a prescribed amount of time (e.g., one minute) after sending the activation message to the handheld device 96 to verify that the MDN has been installed and that the telematics unit 14 has been activated.

Once the call center 24 has been notified that the telematics unit 14 has been reactivated, the telematics unit 14 may receive phone calls.

It is to be understood that once the telematics unit 14 is reactivated, if the user of the vehicle 12 does not have a subscriber profile (e.g., his/her profile was decommissioned), the call center 24 may re-commission the activated telematics unit 14 so that it is associated with a user profile. During the re-commissioning, the user may create a new, or may re-establish his/her previous user account with the call center 24 to create new billing information for telematics services, etc. In an example, the telematics unit 14 may be re-commissioned for use for a limited timed duration according to the user's new subscription agreement with the call center 24. In these instances, the telematics unit 14 may be used for one or more of telematics services.

While several examples have been described in detail, it will be apparent to those skilled in the art that the disclosed examples may be modified. Therefore, the foregoing description is to be considered non-limiting.

The invention claimed is:

1. A method of activating a device, comprising:
    establishing communication between the device and an other device;
    receiving, at the other device, a message including activation information from a third party facility, the activation information including a header and a mobile dialing number;
    via the device, using the header to identify the message as an activation message for the device;
    via the device, retrieving the identified message from the other device; and
    storing the mobile dialing number in a memory operatively associated with the device, the mobile dialing number enabling the third party facility to initiate communication with the device.

2. The method as defined in claim 1 wherein the establishing of the communication between the device and the other device is accomplished via a short range wireless connection.

3. The method as defined in claim 1 wherein prior to the identifying of the message, the method further comprises examining the other device for the message, the examining being accomplished periodically by the device, in response to a trigger, or combinations thereof.

4. The method as defined in claim 1 wherein the header includes a device identification number, a vehicle identification number, a subscriber's name, a security code, an activation command, or combinations thereof.

5. The method as defined in claim 1, further comprising:
    initiating communication with the third party facility; and
    notifying the third party facility that the mobile dialing number has been stored in the memory associated with the device.

6. The method as defined in claim 5 wherein the initiating of the communication with the third party facility is accomplished via i) the device upon storing the mobile dialing number, or ii) the other device upon the retrieving of the identified message by the device.

7. The method as defined in claim 1 wherein prior to receiving the message, the method further comprises:
    establishing communication between the other device and the third party facility; and
    requesting the message from the third party facility.

8. The method as defined in claim 1 wherein the mobile dialing number is temporarily stored in the memory associated with the device to enable the device to receive a single service or a limited timed duration of one or more services from the third party facility.

9. A method of activating a device, comprising:
    establishing communication between the device and an other device, the establishing being accomplished using a short range wireless connection;
    requesting and receiving an activation message by the other device from a third party facility, the activation message including a header and a mobile dialing number;
    examining the other device to identify the header associated with the activation message;
    upon identifying the header, extracting, via the device, the mobile dialing number from the activation message; and
    storing the mobile dialing number in a memory operatively associated with the device, the mobile dialing number enabling communication between the device and the third party facility.

10. The method as defined in claim 9 wherein the short range wireless connection is accomplished using an IEEE 802.11a standard, an IEEE 802.11b standard, an IEEE 802.11g standard, an IEEE 802.11n standard, WiFi, Bluetooth, ZigBee, or combinations thereof.

11. The method as defined in claim 9 wherein the examining of the other device is accomplished by the device periodically, in response to a trigger, or combinations thereof.

12. The method as defined in claim 9 wherein the header includes a device identification number, a vehicle identification number, a subscriber's name, a security code, an activation command, or combinations thereof.

13. The method as defined in claim 9 wherein upon storing the mobile dialing number, the method further comprises:
   initiating communication with the third party facility;
   notifying the third party facility that the mobile dialing number has been stored in the memory associated with the device, thereby reactivating the device.

14. The method as defined in claim 13, further comprising re-commissioning the device such that the device is associated with a user account, via the third party facility, after the third party facility has been notified that the device has been reactivated.

15. The method as defined in claim 13 wherein the initiating of the communication with the third party facility is accomplished via i) the device upon storing the mobile dialing number, or ii) the other device upon the extracting of the mobile dialing number by the device.

16. The method as defined in claim 9 wherein the activation message is a short message service (SMS), text message, or combinations thereof.

17. A system for activating a deactivated device, comprising:
   a handheld communications device in selective and operative communication with the deactivated device via a short range wireless connection;
   a third party facility in selective and operative communication with the handheld communication device, the third party facility configured to generate and transmit, to the handheld communication device, an activation message for activating the deactivated device, the activation message including a header and a mobile dialing number;
   a processor operatively associated with the deactivated device, the processor including:
      computer readable code for examining the handheld communications device for receipt of the activation message by identifying the header; and
      computer readable code for extracting the mobile dialing number from the activation message; and
   a memory operatively associated with the deactivated device and configured to store therein the mobile dialing number extracted from the activation message by the processor, the stored mobile dialing number enabling the third party facility to establish communication with the deactivated device.

18. The system as defined in claim 17 wherein the handheld communications device is selected from a cellular phone, a personal digital assistant, a smart phone, a personal laptop computer, a netbook computer, or combinations thereof.

19. The system as defined in claim 17, further comprising a wireless cellular network configured to establish communication between the handheld communications device and the third party facility.

* * * * *